United States Patent [19]

Osborne

[11] Patent Number: 4,692,303
[45] Date of Patent: Sep. 8, 1987

[54] SPACER CAPTURE ROD TO SPACE GRID ATTACHMENT DEVICE

[75] Inventor: Jon L. Osborne, West Richland, Wash.

[73] Assignee: Exxon Nuclear Company, Inc., Florham Park, N.J.

[21] Appl. No.: 643,440

[22] Filed: Aug. 23, 1984

[51] Int. Cl.⁴ ............................................. G21C 3/32
[52] U.S. Cl. .................................. 376/446; 376/438; 376/441; 376/442
[58] Field of Search ............... 376/446, 438, 441, 442, 376/449

[56] References Cited

U.S. PATENT DOCUMENTS 3,791,466  2/1974  Patterson ........................... 376/442
4,081,324  3/1978  Flora .................................. 376/442
4,508,679  4/1985  Matzner ............................. 376/446

Primary Examiner—Donald P. Walsh
Attorney, Agent, or Firm—Volker R. Ulbrich; Kenneth Watov

[57] ABSTRACT

Vertical and axial movement of fuel rods relative to grid spacers in a fuel bundle of a BWR or PWR nuclear reactor is prevented by use of sleeves welded to various vertical positions upon a fuel rod, whereby the sleeves have horizontally and vertically oriented windows and slots for engaging protrusions and corner springs, respectively, located in the openings for receiving fuel rods of the grid spacers.

9 Claims, 10 Drawing Figures

SPACER CAPTURE ROD TO SPACE GRID ATTACHMENT DEVICE

The field of the present invention relates generally to fuel bundles for either pressurized water or boiling water type nuclear reactors, and more specifically to sleeves for use in the fuel bundle for preventing undesirable movement of grid spacers holding the fuel rods of the bundle in position.

The present invention relates to nuclear reactor fuel bundles such as are used in reactors of the pressurized water or boiling water type. In such bundles, fissionable fuel is disposed within elongated tubular fuel rods which are mounted in parallel array between a pair of end plates. When the bundle is in service in a nuclear power reactor, water passes along the outer surface of the fuel rods, receiving heat therefrom owing to the reaction occurring inside. In order to permit uniform heat removal and to avoid overheating of the rods, it is necessary that they be accurately spaced apart laterally. Maintaining the spacing of the elongated rods in such a closely spaced array under conditions in which vibration naturally occurs, requires a carefully designed spacer unit which has been the subject of many prior art patents. In particular, the present invention may be used with a spacer of the type described in U.S. Pat. No. 3,852,154 assigned to the assignee of the present invention, which is incorporated by reference herein.

In the spacer design taught in U.S. Pat. No. 3,852,154, a corner mounted spring engages the side of fuel rods passing through each of the grid opening formed by the spacer and holds the fuel rod against protrusions which have been formed from the grid walls. This three-point engagement provides a stable positioning of the fuel rod within the spacer. In a typical fuel bundle there are a plurality of spacers disposed along the length of the fuel rod. In order to assure proper positioning during operation, the spacers must be secured in the desired position; otherwise, they may be displaced along the longitudinal direction of the fuel rods due to the vibration and the flow of water adjacent the tubes. Typical prior art devices which perform the function of securing a grid spacer against movement, may be found in British Pat. No. 1,148,881, and U.S. Pat. Nos. 3,802,995, 3,984,284; and 4,081,324, all assigned to the same assignee as the present invention. None of these prior art devices are believed to include the improvements of the present invention. The present invention provides a simple and improved construction of the invention of U.S. Pat. No. 4,081,324 to secure the grid spacer in the desired position and which avoids the problems typical of prior art arrangements for securement of these spacers to prevent undesirable movement thereof.

The spacer capture system of the present invention, broadly, includes a spacer capture rod having a guide slot, a pair of longitudinally spaced bosses, and a standoff boss extending radially outward from the surface of the rod, and a vertically oriented slot located in a horizontal plane beneath the longitudinal spaced bosses. The spacer capture rod is used in conjunction with a grid spacer having openings formed by intersecting walls which include protrusions and coacting springs extending from the walls. The guide slot positions the bosses on the rod along a diagonal of the grid spacer opening so that the rod may be inserted into and pass through the opening with the bosses unencumbered by the protrusions from the grid spacer walls. The grid spacer is captured by the capture rod by positioning a protrusion from the grid spacer walls between the engaging bosses on the rod such that movement of the grid spacer in either longitudinal direction is prevented. The standoff boss is in surface contact with a flat wall of the grid spacer opening. A corner spring of the grid spacer engages the vertically oriented slot of the spacer rod to substantially prevent axial rotation therebetween.

In the preferred embodiment the bosses and vertical slot are formed on a sleeve fixed to a capture rod, the sleeve having a longitudinally split to provide the guide slot, the bosses being formed from the raised lobe portions on the sleeve, and the vertical slot being formed from a cutout portion below the bosses. A detailed description of the invention follows.

In the drawings, wherein like elements are indicated by the same reference number:

FIG. 1 is a partial plan view of a typical prior conventional grid spacer used with the capture system of the present invention;

FIG. 2 is a perspective view of the preferred embodiment of the prior invention of U.S. Pat. No. 4,081,324, showing two raised lobe sections having windows;

Figure 1:
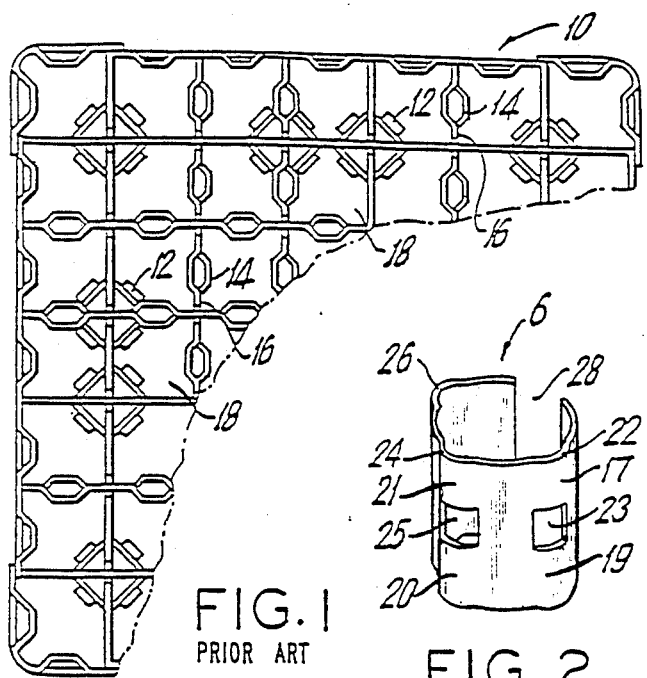

A grid spacer 10 of the type shown in FIG. 1 is described and illustrated in more detail in the referenced U.S. Pat. No. 3,852,154. The openings formed from the walls of the grid spacer each include a corner mounted spring 12 which engages fuel rods passing through each of the openings 18 and urges the fuel rod against protrusions 14 which are formed from two of the walls 16 defining the grid spacer openings. The other two walls of the grid spacer openings are flat. This three-point contact with a single spring 12 holds the fuel rod securely and minimizes vibrations, and ensures correct positioning of the fuel rod. In an assembled fuel bundle, water which may be flowing at a high velocity through the openings 18 in the grid spacer and vibration of the components of the bundle could cause the grid spacer 10 to move both longitudinally and axially with respect to the fuel rods. The improved capture system of the present invention ensures that the fuel rods remain properly spaced by substantially preventing such movement of the grid spacers. The protrusions 14 and corner springs 12 from the walls of the grid spacer 10 provide not only a means of positioning the fuel rods but also a means of securing the grid spacer in a desired position. This is achieved in the present invention by including in the parallel array of fuel rods a capture rod 30 having a sleeve 32 (see FIG. 8) for engaging the grid spacer 10, which is an improvement of the sleeve 6 of the prior art. As will be shown in greater detail, the design of sleeve 6 substantially reduces relative longitudinal movement between the grid spacer 10 and fuel rods, whereas the improved sleeve 32 additionally substantially reduces relative axial movement between the grid spacer 10 and fuel rods.

Figure 2:
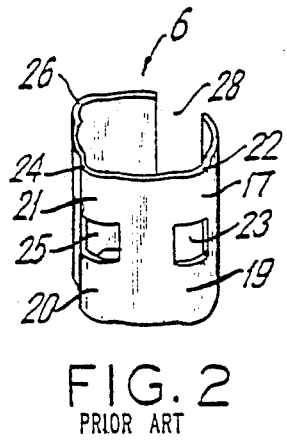

With reference to FIG. 2, the sleeve 6 is split axially and includes three raised lobes 22, 24 and 26 which are located at 90° increments about the periphery of the sleeve. Windows 23 and 25, i.e. openings, are formed in a center portion of two of the lobes 22 and 24. This sleeve 6 is typically fabricated from sheet metal. The remaining portions 17, 19, and 20, 21 on each side of the windows 23 and 25 function as bosses for engaging the protrusions 14 from two of the walls of grid spacer 10. Lobe 26 is of sufficient length to be in surface contact with one of the flat walls forming the grid spacer opening 18 and serves as a standoff boss. The axial split 28 is located at a point opposite the center lobe 25 to provide a guide slot in the longitudinal direction that is aligned with the corner spring 12 when the capture rod 30 is moved longitudinally into position to "capture" the grid spacer 10.

Figure 3:
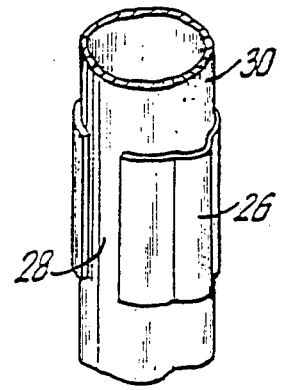
FIG. 3 is a perspective view of the preferred embodiment of the prior invention of FIG. 2 fixed to a section of a capture rod having a lobe without a window and the guide slot.

With reference to FIG. 3, the sleeve 6 is mounted on a portion of a standard fuel rod 30 by welding or other appropriate attachment method. However, in FIG. 3, the sleeve 6 has been rotated relative to the view of FIG. 2 so that the guide slot 28 and the third lobe 26 are more visible. The rod 30 is shown as hollow, although a solid rod will work as well.

Figure 4:
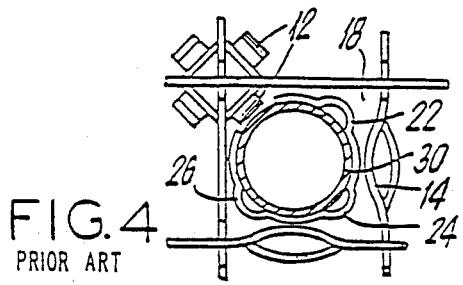
FIG. 4 is an enlarged sectional view of the grid spacer of FIG. 1 combined with the prior invention of FIGS. 2 and 3, and illustrating the spacer capture system disengaged, which illustration is also applicable to the present invention.
Figure 5:
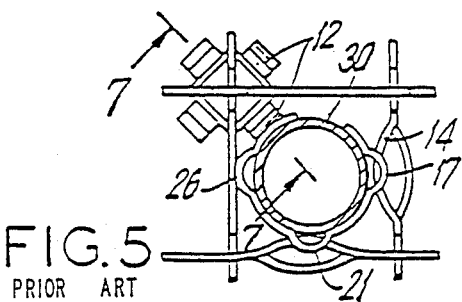
FIG. 5 is a view corresponding to FIG. 4 in which the spacer capture system of either the prior or present invention is engaged.
Figure 6:
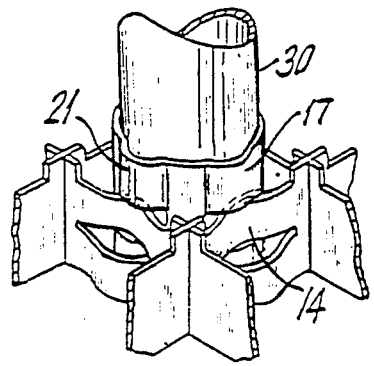
FIG. 6 is a perspective view of the engaged spacer capture system of FIG. 5.
Figure 7:
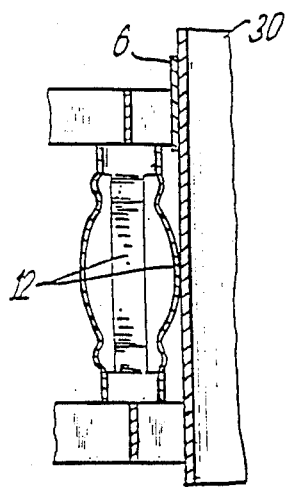
FIG. 7 is a sectional view taken substantially along 7—7 of FIG. 5.

A cross-section of the capture rod (standard fuel rod 30 plus sleeve 6) within the grid spacer 10 opening 18 in the disengaged position is shown in FIG. 4. The spring 12 is pressed against the outer diameter of the fuel rod 30. The guide slot 28 is aligned with the grid spacer corner spring 12 so that the spring 12 will pass through the guide slot as the capture rod (6, 30) slides into position to capture the grid spacer 10. The guide slot 28 positions the sleeve lobes 22, 24, and 26, diagonally with the grid spacer opening 18 so that the capture rod (6,30) may slide through the opening 18 unencumbered by the protrusions 14. The capture rod is longitudinally positioned within the grid spacer opening 18 so that the bosses 19 and 20 and windows 23 and 25 of each of the lobes 22 and 24 are within the opening 18 formed from the walls of the grid spacer. The protrusions 14 on the grid spacer walls are aligned with the windows 23 and 25 and enter the windows when the capture rod is rotated 45° about its axis. The bosses 17, 19 and 20, 21 of the lobes 22 and 24, respectively, on either side of the windows 23 and 25 are then positioned on either side of protrusions 14 and prevent the spacer from moving in either longitudinal direction. The lobe 26 without a window presses against a flat wall of the grid spacer that lacks a protrusion 14 (see FIG. 5). The corner spring 12 is below the collar 6 and presses against the outer diameter of the rod 30 (see FIG. 7). FIGS. 5 and 6 show a cross-sectional, and perspective views, of the capture system in the locked position, respectively. Because of windows in only two of the lobes in the preferred embodiment, the sleeve 6 only allows for rotation of the capture rod in one direction about its longitudinal axis in order to capture the grid spacer. However, if it is desirable to allow for rotation of the capture rod 6,30 in either direction for locking it in position, lobe 26 may also include a window similar to lobes 22 and 24.

Figure 8A:
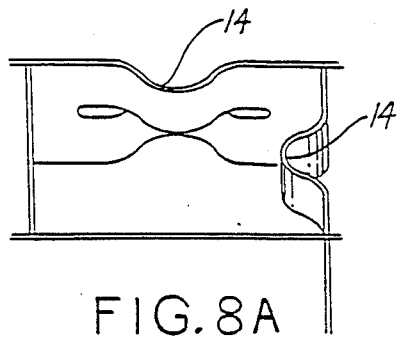
FIG. 8 is an exploded assembly view of the sleeve of the present invention oriented for engaging a corner spring and protrusions of the grid spacer.
Figure 8:
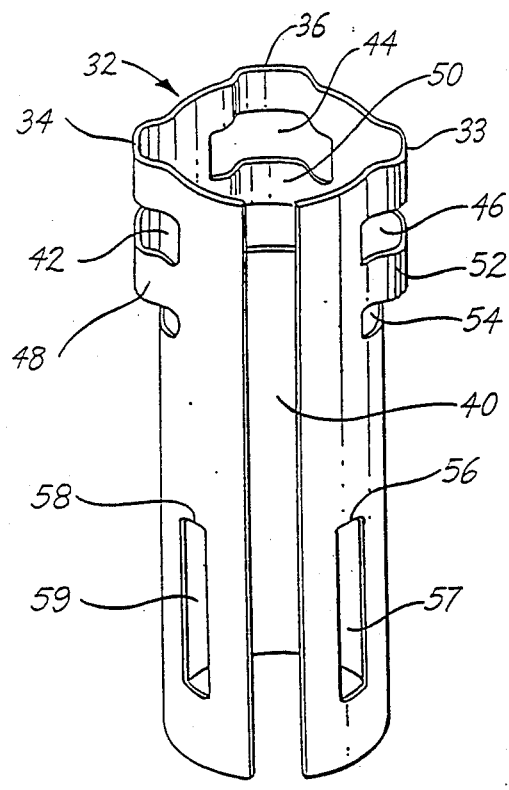
Figure 8B:
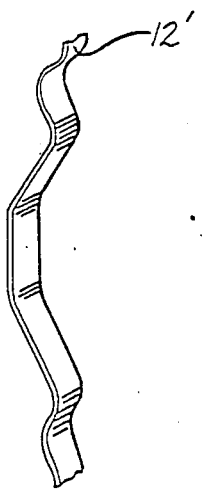

In FIG. 8, sleeve 32 represents a preferred embodiment of the present invention, and an improvement of the prior sleeve 6. Relative to the sleeve 6, the improved sleeve 32 has an elongated lowermost portion including vertically oriented slots 56 and 58 having slot openings 57 and 59, respectively. Sleeve 32 further includes pairs of bosses 34,48 and 36,50 and 38,52, between which windows or cutout portions 42,44,46, respectively are formed. The bosses 17,19,21,20, of sleeve 6, are analogous to bosses 34,38,36,50, respectively of sleeve 32, with the latter bosses having flatter front faces than the former. The cutout portion 54 of sleeve 32 provides for easier and more economical fabrication of raised lobe-like portions or bosses 34,48,36,50,38,52. As shown in this example, protrusions 14 of grid spacer 10 engage windows or openings 36 and 46, and corner spring 12' engages slot opening 57 of vertically oriented slot 56. Note that the portion of corner spring 12' of the present invention engaging the slot opening 57 of sleeve 32 is flatter than prior corner spring 12 of FIG. 7.

Figure 9:
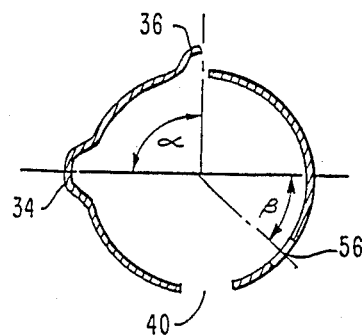
FIG. 9 shows the preferred angular relation between the raised lobes and vertical slots of the present invention.

As partially shown from the sectional cutaway views of FIG. 9, the bosses 34 and 36 are located an angle $\alpha$ (alpha) degrees from one another, and the vertically oriented slot 56 is located clockwise an angle of $\beta$ (beta) degrees from the same vertical plane intersecting bosses 34 and 38. In other words, the pairs of bosses 34,48 and 36,50 are located $\alpha$ degrees from one another, as are the pairs of bosses 36,50 and 38,52. In the preferred embodiment $\alpha$ is ninety (90°) degrees. Vertical slot 56 is located $\beta$ degrees clockwise from the central vertical plane intersecting the pair of bosses 38,52. Similarly, the vertical slot 58 is located $\beta$ degrees counterclockwise from the pair of bosses 34,48. In the preferred embodiment $\beta$ is forty-five (45°) degrees.

Figure 10:
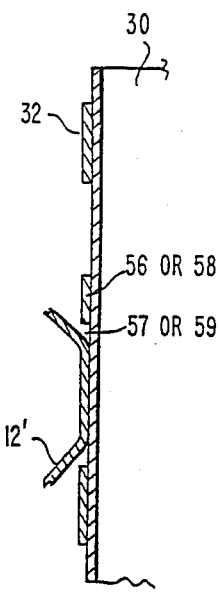
FIG. 10 is partial cutaway sectional view showing the engagement of a corner spring with a vertical slot in a preferred embodiment of the invention.

In typical practice, a number of sleeves 32 corresponding to the number of grid spacers 10 in the fuel assembly, are welded to the exterior of a fuel rod 30 at appropriate predetermined vertical positions thereon, for vertically locating the grid spacers 10. The axial split or open vertical slotways 40 of each sleeve 32 are all successively vertically aligned on the fuel rod 30 prior to welding. In this example, a capture rod is represented by sleeves 32 so positioned and welded upon a rod 30. The assembly precedure first involves orienting capture rod 30,32 for permitting this rod to be slid into the grid spacers 10 with the full length of certain slots 40 passing over vertical springs 12' of the grid spacers 10. When the capture rod 30,32 and grid spacers 10 are appropriately positioned, the rod 30,32 is then turned forty-five (45°) degrees from the position shown in FIG. 4 to that of FIG. 5. In the FIG. 5 position the protrusions 14 lock into two successive pairs of bosses 34,48 and 36,50, within windows 42,44, respectively, or pairs of bosses 38,52 and 36,50, within windows 46,44, respectively, depending upon whether the capture 30,32 was turned counterclockwise or clockwise, respectively. As with the prior sleeve 6, such engagement prevents vertical or longitudinal movement of rod 30 relative to the grid spacer 10. Additionally, when capture rod 30,32 is so turned counterclockwise or clockwise, corner springs 12' of the grid spacers 10 will snap into either slot opening 59 of vertical slot 58, or slot opening 57 of vertical slot 56, respectively, for preventing rotary or axial movement of the rods 30 relative to the grid spacers 10. FIG. 10 shows a vertical or corner spring 12' engaging vertical slot openings 59 or 57. Note that the shape of the corner spring 12' is configured for engaging a substantial portion of rod 30 lying behind slot opening 59 or 57.

In certain applications the sleeve 32 can be simplified by eliminating either window 42 and vertical slot 58, or window 46 and vertical slot 56. However, such simplification would then require that a capture rod 30,32 be always turned in the same clockwise or counterclockwise direction, not either direction, for "locking" the capture rod 30,32 to the spacer grids 10. Other modifications may be apparent to those skilled in the art, without departing from the spirit and scope of the invention as claimed herein.

What is claimed is:

1. In a nuclear fuel assembly having a parallel array of fuel rods, at least one of said fuel rods serving as a spacer capture rod, said fuel rods being positioned for longitudinally extending through openings formed from intersecting walls of a grid spacer, some of said walls being flat and others of said walls having protrusions extending into said openings and coacting springs for holding said fuel rods in laterally fixed positions, said protrusions and springs being horizontally and vertically oriented, relative to the longitudinal axes of said fuel rods, a spacer capture system which secures said grid spacer in fixed position relative to said fuel rods, comprising a cylindrical-like sleeve rigidly fixed to said spacer capture rod, said sleeve including:
   a longitudinal guide slot; and
   a plurality of spaced apart horizontally oriented pairs of vertically opposed bosses extending radially outward from the outer face of an upper portion of said sleeve for engaging at least one of said protrusions from said grid spacer walls between one of said pair of bosses such that movement of said grid spacer in either longitudinal direction is substantially prevented and the vertical location of said spacer grid is fixed; and
   at least one vertically oriented slot located in a lower portion of said sleeve for receiving and locking against one of said springs, the coaction therebetween substantially preventing axial rotation of said capture rod relative to said grid spacer.

2. The spacer capture system of claim 1 wherein said sleeve includes an axial split extending the length of said sleeve for providing said guide slot.

3. The spacer capture system of claim 1, further including said vertical slot circumferentially spaced from said pairs of bosses.

4. The spacer capture system of claims 1, or 2, or 3, wherein said sleeve further includes arc-like slots formed between each of said pairs of vertically opposed bosses for receiving one of said protrusions, respectively.

5. The spacer capture system of claim 4, further including said springs shaped for extending through said vertically oriented slot of said sleeve for engaging a portion of the outer surface of an associated spacer capture rod.

6. The spacer capture system of claim 1, wherein said pairs of bosses and said vertical slot of said sleeve are positioned relative to said protrusions and springs of said spacer grid, for allowing said capture rod with said sleeve to be inserted into an opening of said spacer grid to a predetermined position, whereafter rotation of said spacer capture rod causes given ones of said protrusions to engage said arc-like slots, and an associated spring to engage said vertical slot, thereby "locking" said capture rod to said spacer grid.

7. The spacer capture system of claim 1, further including a plurality of said sleeves mounted upon at least one spacer capture rod at predetermined vertical positions thereon, for securing a like plurality of said spacer grids at said vertical positions, respectively, of said capture rod.

8. The spacer capture system of claim 1, further including a plurality of said spacer capture rods, each having a plurality of said sleeves rigidly attached at predetermined vertical positions upon said spacer capture rods, respectively, for securing a plurality of said spacer grids at desired vertical positions in said fuel assembly, with substantial elimination of relative longitudinal and axial movement between said spacer grids and said spacer capture rods.

9. In a nuclear fuel assembly including a parallel array of fuel rods which longitudinally extend through openings formed from intersecting walls of a grid spacer, with some of said walls having protrusions extending into said openings and coacting springs for holding said fuel rods in spaced apart laterally fixed positions, a spacer capture system for securing said grid spacer in a fixed position, comprising:
   at least one of said fuel rods serving as a spacer capture rod;
   a cylindrical-like sleeve including an axial split extending the full length of said sleeve, three pairs of vertically opposed bosses extending radially outward from an outer face of an upper portion of said sleeve, one of said pairs of bosses being located opposite said axial split, the other two of said pairs of bosses being located 90° from either side of said one pair of bosses, respectively, and first and second vertically oriented slots located in a lower portion of said sleeve at positions 45° to either side of said axial split, respectively;
   said sleeve being rigidly attached to said spacer capture rod at predetermined position upon said rod;
   said spacer capture rod being insertable through one of said openings in said spacer grid, said axial split of said sleeve permitting said spacer capture rod to be easily inserted into said opening without interference from an associated one of said coacting springs, whereby when said spacer capture rod with said sleeve is properly positioned within said grid spacer, said spacer capture rod is turned 45° for engaging two of said protrusions from the associated walls of said grid spacer between two of said pairs of bosses, respectively, thereby substantially preventing longitudinal movement of said grid spacer relative to said spacer capture rod, and for further engaging the associated one of said springs into one of said vertically oriented slots, for thereby substantially preventing axial movement of said spacer capture rod.

* * * * *